United States Patent [19]

Soma et al.

[11] Patent Number: 5,432,024
[45] Date of Patent: Jul. 11, 1995

[54] POROUS LANTHANUM MANGANITE SINTERED BODIES AND SOLID OXIDE FUEL CELLS

[75] Inventors: Takao Soma, Nishikamo; Tomonori Takahashi, Chita; Shinji Kawasaki, Nagoya; Kazuyo Mori, Ichonomiya; Yoshihiro Ito, Nagoya; Katsuki Yoshioka, Himeji, all of Japan

[73] Assignee: NGK Insulators, Ltd., Japan

[21] Appl. No.: 133,873

[22] Filed: Oct. 12, 1993

[30] Foreign Application Priority Data

| Oct. 14, 1992 | [JP] | Japan | 4-275950 |
| Oct. 14, 1992 | [JP] | Japan | 4-275951 |
| Oct. 14, 1992 | [JP] | Japan | 4-275953 |
| Oct. 14, 1992 | [JP] | Japan | 4-275954 |
| Mar. 10, 1993 | [JP] | Japan | 5-049313 |
| Mar. 10, 1993 | [JP] | Japan | 5-049314 |
| Mar. 31, 1993 | [JP] | Japan | 5-073974 |

[51] Int. Cl.[6] .................. C04B 35/02; H01M 4/88; H01M 4/90
[52] U.S. Cl. .................. 429/44; 252/182.1; 423/594; 423/599; 429/30; 429/33; 429/40; 501/108; 501/123; 501/126
[58] Field of Search .................. 501/108, 123, 126; 423/599, 594; 429/30, 33, 40, 44; 252/182.1

[56] References Cited

U.S. PATENT DOCUMENTS

| 4,562,124 | 12/1985 | Ruka | 429/33 |
| 4,789,561 | 12/1988 | Schaefer et al. | 429/33 |
| 5,096,642 | 3/1992 | Shirasaki | 501/108 |
| 5,106,706 | 4/1992 | Singh et al. | 429/40 |
| 5,108,850 | 4/1992 | Carlson et al. | 429/40 |
| 5,244,753 | 9/1993 | Taniguchi et al. | 429/33 |
| 5,308,712 | 5/1994 | Seike et al. | 429/40 |
| 5,342,704 | 8/1994 | Vasilow et al. | 429/33 |

FOREIGN PATENT DOCUMENTS

| 0467590 | 1/1992 | European Pat. Off. |
| 0577420 | 1/1994 | European Pat. Off. |
| 2066585 | 7/1971 | France | 429/33 |

OTHER PUBLICATIONS

Energy General Engineering, 13, 2, pp. 52–68, 1990. (month not available).
J. Electrochem. Soc., vol. 138, No. 5, May 1991.
Materials Research Bulletin, vol. 24, No. 3, Mar. 1989, by A. Hammouche et al., pp. 367–380.
Chemical Abstracts, vol. 114, No. 22, Jun. 3, 1991, p. 206.
Chemical Abstracts, vol. 114, No. 10, Mar. 11, 1991, p. 209.
Patent Abstracts of Japan, vol. 13, No. 496 (E-843) Nov. 9, 1989, p. 1/1.
Inorganic Materials, vol. 22, No. 6, Jun. 1986, by I. Ya. Lyubkina et al., pp. 861–865.
Inorganic Materials, vol. 26, No. 1, Jan. 1990, by L. A. Tikhonova et al., pp. 149–153.
Physica Status Solidi A, vol. 122, No. 1, Nov. 1990, by J. Echigoyas et al., pp. 87–95.
Soviet Physics Solid State, vol. 33, No. 6, Jun. 1991, by I. O. Troyanchuk et al., pp. 1063–1064.
Soviet Physics JETP, vol. 75, No. 1, Jul. 1992, by I. O. Troyanchuk et al., pp. 132–137.
Journal of Solid State Chemistry, vol. 100, No. 2, Oct. 1992, by K. Knizek et al., pp. 292–300.
Journal of the Electrochemical Society, vol. 138, No. 5, May 1991, by S. Otoshi et al., pp. 1519–1523.

Primary Examiner—Wayne Langel
Attorney, Agent, or Firm—Parkhurst, Wendel & Rossi

[57] ABSTRACT

A porous sintered body composed mainly of lanthanum manganite in which a part of lanthanum atoms at A-sites of the lanthanum manganite are substituted by atoms of a metal selected from the group consisting of alkaline earth metals and rare earth metals. The dimensional shrinkage amount of the porous sintered body in heat cycling between room temperature and 1,000° C. is not more than 0.01% per one heat cycle.

37 Claims, 5 Drawing Sheets

FIG_5

POROUS LANTHANUM MANGANITE SINTERED BODIES AND SOLID OXIDE FUEL CELLS

BACKGROUND OF THE INVENTION (1) Field of the Invention

The present invention relates to porous lanthanum manganite sintered bodies and solid oxide fuel cells using such porous sintered bodies as materials for air electrodes.

(2) Related Art Statement

Since solid oxide fuel cells ("SOFC"s) operate at a high temperature of around 1,000° C., an electrode reaction is extremely active, and the SOFCs need no noble metal catalyst such as platinum at all. Further, their polarization is low, and output voltage is relatively high. Thus, an energy-converting efficiency is far greater as compared with other fuel cells. In addition, since all the constituent materials are solid, the solid oxide fuel cell is stable and has a long life.

In order to develop SOFCs, it is important to look for materials stable at high temperatures. As a material for the air electrodes, sintered bodies of lanthanum manganite are considered promising (Energy General Engineering, 13, 2, pp 52-68, 1990). As such lanthanum manganite sintered bodies, lanthanum manganite sintered bodies having a substantially stoichiometrical composition and lanthanum manganite sintered bodies in which a part of A-sites (lanthanum-sites) are missing (manganese-rich composition) are known. It is reported that the weight of the lanthanum manganite sintered body in which a part of the A-sites are missing decreases when the temperature is raised from room temperature to 1,000° C. (J. Electrochem. Soc. 138, 5, pp 1519 to 1523, 1991). In this case, the weight of the sintered body begins to decrease from near 800° C.

In particular, porous sintered bodies composed of lanthanum manganite doped with Ca or Sr at A-sites are regarded promising as materials for air electrodes involving self-supporting type air electrode tubes.

SUMMARY OF THE INVENTION

However, the present inventors first found out that such porous sintered bodies have the following problems.

That is, it was made clear that when the above SOFC is subjected to heating-cooling cycling between a temperature range of 900 to 1,100 in which the SOFC generates power and a temperature range of room temperature to 600° C., cracking occurs between the air electrode tube made of the above porous sintered body and other constituent materials of a cell unit, which may result in fracture of the cell unit. However, even when such a cell unit is operated at 1,000° C. for a long time, the above cracking did not occur at all. Therefore, it is considered that this phenomenon is caused not by shrinkage of the above porous sintered body during the firing but by the dimensional change during the heat cycling.

It is an object of the present invention to afford stability against the above heat cycle upon porous sintered bodies of lanthanum manganite.

A first aspect of the present invention relates to porous sintered bodies comprising lanthanum manganite in which a part of lanthanum atoms at A-sites are substituted by atoms of a metal selected from the groups consisting of alkaline earth metals and rare earth metals, wherein a dimensional shrinkage amount caused by heat cycling between room temperature and 1,000° C. is not more than 0.01% per one heat cycle.

Through the specification and claims of this application, the term "atoms of a metal selected from the groups consisting of alkaline earth metals and rare earth metals" means atoms of a metal which substitute for a part of lanthanum atoms at the A-sites of the lanthanum manganite, and such metals include scandium, yttrium, cerium, praseodymium, neodyonium, prometium, samarium, europium, gadolinium, terbium, dysprosium, holmium, erbium, thulium, ytterbium, lutetium, calcium, strontium, barium, and radium.

Stability of porous sintered bodies of lanthanum manganite doped with Ca, Sr or the like at A-sites was examined by subjecting the porous sintered bodies to heating-cooling cycling between a temperature range of 900° C. to 1,100° C. and a temperature range of room temperature to 600° C. As a result, it was revealed that the porous sintered bodies were shrunk in amounts of 0.01 to 0.1% per one heat cycle. In addition, it was also revealed that shrinkage due to heat cycling is not converged even after heat cycling by 100 times, and that the shrunk amount reaches as much as a few or several percentages. If an air electrode shrinks like this, cracking occurs between the air electrode and other constituent materials of the cell unit, which may result in fracture of the cell unit.

Based on the above knowledge, the present inventors further continued their research, and consequently discovered that when the dimensional shrinkage caused in the porous sintered body made of lanthanum manganite by heat cycling between room temperature and 1,000° C. is suppressed to not more than 0.01%, the above cracking will not occur between the air electrode and the other constituent materials.

Further, the present inventors have further gone ahead with their research on the mechanism by which dimensional shrinkage of the porous sintered body in the above heat cycling occurs. As a result, the inventors discovered that when a quotient obtained by dividing a weight of the porous sintered body at 1,000° C. by that at room temperature is not less than 0.9988, the above dimensional shrinkage is conspicuously suppressed. That is, when the porous sintered body is heated from room temperature to a high temperature around 1,000° C., the weight of the porous sintered body decreases, and this weight decrease has clear correlationship to the dimensional shrinkage in the heat cycling.

The mechanism of the above phenomenon is not clear at present. However, when the temperature of the sintered body is raised from room temperature to around 1,000° C., the weight of the porous sintered body slightly decreases, whereas when the sintered body is cooled to room temperature again, the weight is restored. The dimensionally shrunk amount of the porous sintered body in the above heat cycling varies somewhat depending upon the particle size of crystals constituting the sintered body, the heating rate, the cooling rate and the partial pressure of oxygen in the heat cycle. That is, it was discovered that as the crystalline particle diameter decreases, as the heating rate and/or as the cooling rate decreases, and/or as the partial pressure of oxygen in the atmosphere increases, the dimensionally shrunk amount of the porous sintered body increases. In order to decrease the dimensionally shrunk amount in the heat cycling, it is preferable to suppress the average crystalline particle diameter of the porous sintered body to not less than 3 μm.

In view of the above, it is presumed that oxygen comes in or out of crystals of lanthanum manganite in a temperature range of 800° C. or more in the above heat cycle, thereby causing change in weight of the porous sintered body. It is further considered that when oxygen comes in or out of the crystals, crystalline lattices are distorted, so that materials transfer between metallic atoms is promoted, and the sintering phenomenon of the porous body advances.

Further, the present inventors have advanced their research, and consequently they discovered that there is a clear correlationship between an activating energy of an electric conductivity (hereinafter referred to as "activating energy") of the porous sintered body and the dimensional shrinkage in the above heat cycling. The "activating energy" of the electric conductivity of the porous sintered body means a gradient of a straight line obtained by plotting the relation between the temperature and the electric conductivity in a coordinate in which the temperature and the electric conductivity are taken along the abscissa and the ordinate, respectively. That is, the following has been made clear through the formation of Arrhenius plot diagrams over a wide range of 200° C. to 1,000° C. Namely, it has been made clear that the dimensional shrinkage proceeds in the heat cycling in the case of the porous sintered body in which the activation energy in the range of 200° C. to 600° C. clearly differs from that in the range of 900° C. to 1,000° C.

More specifically, it has been clarified that if the difference between the activating energy in the range of 200° C. to 600° C. and the activating energy in the range of 900° C. to 1,000° C. is set at not more than 0.01 eV, the dimensional shrinkage caused through heat cycling between room temperature and 1,000° C. can be suppressed to not more than 0.01% per one heat cycle.

The reason why the activating energy differs between in the range of 200° C. to 600° C. and in the range of 900° C. to 1,000° C. in this manner is not clear, but it is considered that this occurs through the distortion of the crystalline lattices of the perovskite structure when oxygen comes in or out of the crystals during the heat cycle as mentioned above.

In order to suppress the difference between the activating energy in the range of 200° C. to 600° C. and the activating energy in the range of 900° C. to 1,000° C. to not more than 0.01 eV, or in order to control the quotient obtained by dividing the weight of the porous sintered body at 1,000° C. by that at room temperature to not less than 0.9988, it is effective that the substituting amount of calcium at the A-sites is controlled to not less than 25% and not more than 35% or the substituting amount of strontium at the A-sites is controlled to not less than 20% and not more than 40%. If the substituting amount of calcium at the A-sites is set at not more than 20% or if the substituting amount of strontium is set at not more than 15%, it is effective to substitute a part of manganese atoms at B-sites by a metal selected from the group consisting of aluminum, magnesium, cobalt and nickel. In this case, the substituting amount is preferably 2% to 20%, more preferably 5% to 20%.

The feature that the dimensional shrinkage in the heat cycling is not more than 0.01% per one heat cycle means the average value of dimensional changes of the porous sintered body observed in a first heat cycle to tenth heat cycling after the porous body is sintered.

Presence of inevitable impurities entering lanthanum manganite during the producing steps may be allowed in the porous sintered body according to the present invention.

The porous sintered body according to the present invention may be preferably used particularly as high temperature electrode materials stable against the heat cycling. As such high temperature electrode materials, air electrode materials for unclear fusion furnaces, MHD power generators, and the like may be recited. In particular, the porous sintered bodies according to the present invention may be favorably used as air electrodes for the SOFCs. In addition, the porous sintered bodies according to the present invention are preferably used as materials for self-supporting type air electrode substrates also functioning as substrate.

Such an air electrode substrate may be used as a support body of a unit cell, and constituent parts such as a solid electrolyte film, a fuel electrode film, an interconnector, and a separator are laminated on the air electrode substrate. In this case, the air electrode substrate may be shaped in a cylindrical form with opposite ends opened, a bottomed cylindrical form with one end opened and the other closed, a planar form, or other form. Among them, either of two cylindrical form is particularly preferred, because no great thermal stress is difficult to act thereupon and gas-sealing is easily effected.

The porosity of the porous sintered body is preferably set at 5% to 40%. When the porous sintered body is used as a material for an air electrode in an SOFC, the porosity is more preferably 15% to 40%, most preferably 25% to 35%. When the porosity of the air electrode is set at not less than 15%, the gas-diffusing resistance can be reduced, whereas when the porosity is suppressed to not more than 40%, strength can be maintained to some extent.

When the porous sintered body according to the present invention is used as the material for the air electrode in the SOFC, the coefficient of thermal expansion of the porous sintered body must be set to near those of the filmy solid electrolyte and the filmy fuel electrode. When the solid electrolyte film is formed from yttria-stabilized zirconia, in order to match the thermal expansion between the air electrode and the solid electrolyte film, the substituting amount of calcium at A-sites in lanthanum manganite is preferably 10% to 20%, whereas the substituting amount of strontium at the A-sites is preferably 5% to 15%.

In Japanese patent application Laid-open No. 1-200,560, an electrode material having a composition of $La_{1-x}A_xMn_{1-y}B_yO_3$ in a perovskite type composite oxide is disclosed, in which A is Ca or Sr, B is nickel or chronium, $0 \leq x \leq 0.4$, and $0 < y \leq 0.25$. By using the electrode material having such a composition, bulky electric conductivity ($\sigma$) and interface electric conductivity ($\sigma_E$) are enhanced to lower electrode resistance and polarization potential. However, the problem that the porous sintered body is shrunk by heat cycling as discussed in the present invention is not recogniated at all in this reference, and completely no motivation to make the skilled person reach the invention exists therein. Further, as is clear from Examples of Japanese patent application Laid-open No. 1-200,560, the substituting amount of calcium at the A-sites is 40% at the maximum, and therefore the above electrode material is not suitable as an air electrode for an SOFC from the standpoint of the coefficient of thermal expansion.

A second aspect of the present invention relates to porous sintered bodies made of lanthanum manganite in which a part of manganese atoms at B-sites of the lanthanum manganite are substituted by atoms of at least one metal selected from the group consisting of aluminum, cobalt, magnesium and nickel, wherein a dimensional shrinkage of the sintered body caused by heat cycling between room temperature and 1,000° C. is not more than 0.01% per one heat cycle.

The present inventors has further advanced their investigation on the problems of the weight reduction and the dimensional shrinkage in the heat cycling as mentioned in connection with the first aspect of the present invention. As a result, the inventors have discovered that the dimensional shrinkage in the above heat cycling is conspicuously suppressed when a part of the B-sites of lanthanum manganite constituting the porous sintered body are substituted by aluminum, cobalt, magnesium or nickel. This mechanism is not clear. It is not clear, either, why only the metal atoms specified above are effective.

The substituting amount at the B-sites of lanthanum manganite by atoms of at least one metal selected from the group of aluminum, cobalt, magnesium and nickel is preferably not less than 0.02% and not more than 20%. If the substituting amount is less than 0.02%, the shrinkage-suppressing effect is not remarkable, whereas if the substituting amount is more than 20%, the coefficient of thermal expansion increases so that incompatibility occurs between the zirconia solid electrolyte and the air electrode, and the electric conductivity greatly decrease.

Further, since lanthanum manganite may take a non-stoicheometrical composition, change in the composition of lanthanum manganite resulting from inevitable impurities slightly entering during the producing steps of the porous sintered body may be also allowed in the second aspect of the present invention.

The porous sintered bodies according to the second aspect of the present invention have the same uses as those of the porous sintered bodies according to the first aspect of the present invention.

The porosity of the porous sintered body according to the second aspect of the present invention is preferably 5% to 40%. When the porous sintered body is used as a material for an air electrode in an SOFC, the porosity of the sintered body is more preferably 15% to 40%, most preferably 25% to 35%. When the porosity of the air electrode is set at not less than 15%, the gas-diffusing resistance is reduced, whereas when the porosity is set at not more than 40%, strength may be maintained to some extent.

When the porous sintered body according to the second aspect of the present invention is used as the material for the air electrode in the SOFC, the coefficient of thermal expansion of the porous sintered body must be set to near those of the filmy solid electrolyte and the filmy fuel electrode. When this solid electrolyte film is made of yttria-stabilized zirconia, in order to match the thermal expansion of the air electrode with that of the solid electrolyte film, the substituting amount of calcium at A-sites of lanthanum manganite is preferably 10% to 30%, whereas the substituting amount of strontium at the A-sites is preferably set at 5% to 20%.

A third aspect of the present invention relates to porous sintered bodies made of lanthanum manganite in which a part of lanthanum atoms at A-sites are substituted by calcium, and a substituting amount of calcium is not less than 25% and not more than 35% of the A-sites, wherein the dimensional shrinkage caused in heat cycling between room temperature and 1,000° C. is not more than 0.01% per one heat cycle.

Further, the third aspect of the present invention also relates to porous sintered bodies made of lanthanum manganite in which a part of lanthanum atoms at A-sites are substituted by strontium, and a substituting amount of strontium is not less than 20% and not more than 40% of the A-sites, wherein the dimensional shrinkage amount caused in heat cycling between room temperature and 1,000° C. is not more than 0.01% per one heat cycle.

The present inventors have further continued their investigations on the problems of the weight reduction and the dimensional shrinkage in the heat cycling as mentioned in connection with the first aspect of the present invention, and consequently the inventors have succeeded in substantially suppressing the dimensional shrinkage of the porous sintered body by specifying the doping amount of Ca or Sr at the A-sites of lanthanum manganite.

More particularly, it was made clear that when the substituting amount of calcium is set to not less than 25% and not more than 35% of the A-sites, the dimensional shrinkage caused by the heat cycling between room temperature and 1,000° C. can be suppressed to not more than 0.01% per one heat cycle. On the other hand, it was also made clear that when the substituting amount of strontium doping lanthanum manganite is not less than 20% and not more than 40% of the A-sites, similar effects can be obtained.

Further, when the substituting amount of calcium is not less than 30%, the dimensional shrinkage which would be caused by the heat cycling is not almost seen at all. If the substituting amount of calcium is more than 35%, the coefficient of thermal expansion of the porous sintered body increased. This causes incompatibility in coefficient of thermal expansion between the porous sintered body and the zirconia solid electrolyte.

The chemical composition of lanthanum manganite according to the third aspect of the present invention may contain substituting atoms other than manganese atoms at B-sites or the chemical composition may not contain such other substituting atoms. When substituting atoms other than manganese atoms are contained in the B-sites, substituting atoms may be selected from those of a metal selected from the group consisting of iron, chromium, titanium, cobalt, magnesium, zinc, copper, aluminum and nickel. The substituting amount of such other substituting atoms is preferably not more than 10%. Further, presence of inevitable impurities may be accepted in the third aspect.

The porous sintered bodies according to the third aspect of the present invention have the same uses as those in the first aspect of the present invention.

The porous sintered body according to the third aspect of the present invention preferably has the porosity of 5% to 40%. When the sintered body is used as a material for an air electrode in an SOFC, the porosity is more preferably 15% to 40%, and further preferably 25% to 35%. In this case, when the porosity of the air electrode is set at not less than 15%, the gas-diffusing resistance is reduced, whereas when the porosity is set at not less than 40%, strength can be maintained to some extent.

A fourth aspect of the present invention relates to porous sintered bodies made of lanthanum manganite in which a part of lanthanum atoms at A-sites are substituted by atoms of a metal selected from the group consisting of alkaline earth metals and rare earth metals, and the content of iron is not more than 40 ppm, wherein the dimensional shrinkage caused in heat cycling between room temperature and 1,000° C. is not more than 0.01% per one heat cycle.

Further, the fourth aspect of the present invention also relates to porous sintered bodies made of lanthanum manganite in which a part of lanthanum atoms at A-sites are substituted by atoms of a metal selected from the group consisting of alkaline earth metals and rare earth metals, and the content of silicon is not less than 100 ppm, wherein the dimensional shrinkage caused in heat cycling between room temperature and 1,000° C. is not more than 0.01% per one heat cycle.

In view of the above-mentioned knowledge, the present inventors have further continued their investigation on the problems of the weight reduction and the dimensional shrinkage as mentioned in connection with the first aspect of the present invention. As a result, the inventors have discovered clear correlationship between the content of iron or silicon entering the porous sintered body as an impurity and the dimensional shrinkage of the sintered body in the heat cycling. Then, the inventors have succeeded substantial control of the dimensional shrinkage of the porous sintered body by utilizing the above correlationship.

That is, iron or silicon is generally likely to enter products as an impurity during the production steps of ceramics. The present inventors have discovered that a very fine amount of iron entering the porous sintered body made of lanthanum manganite as impurity aids the material transfer of metallic atoms during the heating and cooling courses in the heat cycling so that the dimensional shrinkage of the porous sintered body is promoted. The inventors have then succeeded in suppressing the dimensional shrinkage of the sintered body to not more than 0.01% per one heat cycle by setting the content of iron in lanthanum manganite to not more than 40 ppm. If the content of iron is more than 40 ppm, the effect of suppressing the dimensional shrinkage in the heat cycling is not remarkable.

The smaller the content of iron in lanthanum manganite, the better is the result. However, it is very difficult to control the content of iron to less than 10 ppm in view of the actual production steps. If control is tried to suppress the content of iron to less than 10 ppm, the production cost largely rises.

On the other hand, the present inventors have discovered that controlling the content of silicon in lanthanum manganite to not less than 100 ppm is effective for suppressing the above dimensional shrinkage of the porous sintered body. The reason for this phenomenon is not clear. However, it is presumed that silica is distributed in grain boundaries among particles of lanthanum manganite, which suppresses the material transfer of the metallic atoms. If the content of silicon in lanthanum manganite is more than 5,000 ppm, electric resistance increases due to the presence of Si in the grain boundaries. Thus, the porous sintered body having the content of Si being more than 5,000 ppm is unsuitable as a high temperature electrode material.

The porous sintered bodies according to the fourth aspect of the present invention has the same uses as those according to the first aspect of the present invention.

The porous sintered body according to the fourth aspect of the present invention preferably has a porosity of 5% to 40%. When the sintered body is used as a material for an air electrode in an SOFC, the porosity is more preferably 15% to 40%, and further preferably 25% to 35%. In this case, when the porosity of the air electrode is set at not less than 15%, the gas-diffusing resistance is reduced, whereas when the porosity is set at not less than 40%, strength can be maintained to some extent.

When the porous sintered body according to the fourth aspect of the present invention is used as the material for the air electrode in the SOFC, the coefficient of thermal expansion of the porous sintered body must be set to near those of the filmy solid electrolyte and the filmy fuel electrode. When this solid electrolyte film is made of yttria-stabilized zirconia, in order to match the thermal expansion of the air electrode with that of the solid electrolyte film, the substituting amount of calcium at A-sites of lanthanum manganite is preferably 10% to 25%, whereas the substituting amount of strontium at the A-sites is preferably set at 5% to 15%.

The chemical composition of lanthanum manganite according to the fourth aspect of the present invention may contain substituting atoms other than manganese atoms at the B-sites or the chemical composition may not contain such other substituting atoms. When substituting atoms other than manganese atoms are contained at the B-sites, substituting atoms may be selected from atoms of a metal selected from the group consisting of chromium, titanium, cobalt, magnesium, zinc, copper, aluminum and nickel. The substituting amount of such other substituting atoms is preferably not more than 10% of the B-sites.

In the fourth aspect of the present invention, presence of inevitable impurities may be accepted.

It is considered that iron entering lanthanum manganite as impurity exists in the B-sites.

The porous sintered bodies according to the present invention may be generally produced as follows:

As starting materials, oxides, carbonates, hydroxides, organic compounds or metal compounds of La, Ca, Sr, Mn, Al, Ni, Co and Mg are used. These starting materials are selectively employed, and given amounts thereof are measured and mixed to give desired compositional ratios. Then, a perovskite compound is synthesized from the resulting mixture at 1,000° C. to 1,700° C. The synthesized product is milled to the average particle diameter ($D_{50}$) of 1 to 10 μm, and appropriate binder, dispersant, pore-forming agent, water, etc. are mixed into the milled powder, which is molded. In this case, an appropriate molding process is selectively employed depending upon intended molding shape, microstructure, productivity, etc. The molding is fired at 1,000° C. to 1,700° C. to obtain a desired porous sintered body.

The solid oxide fuel cell according to the present invention can be used by using such a porous sintered body as an air electrode according to a conventional process.

These and other objects, features and advantages of the invention will be appreciated upon reading of the following description of the invention when taken in conjunction with the attached drawing, with the understanding that some modifications, variations and changes of the invention could be easily be made by the skilled person in the art to which the invention pertains without departing from the spirit of the invention or the scope of claims appended hereto.

BRIEF DESCRIPTION OF THE DRAWINGS

For a better understanding of the invention, reference is made to the attached drawings, wherein.

DETAILED DESCRIPTION OF THE INVENTION

The present invention will be explained in more detail with reference to Examples and Comparative Examples given below.

I. In the following, the first aspect of the present invention will be explained in more detail with reference to Examples and Comparative Examples:

Experiment 1

As starting materials, $La_2O_3$, $Mn_3O_4$, $CaCO_3$, $Al_2O_3$ and $MgO$ powders were used. In each sample, given amounts of starting materials were measured according to a compounding recipe given in Table 1, and mixed together. The resulting mixed powder was molded under a pressure of 1 tf/cm$^2$ by cold isostatic pressing, thereby producing a molding. The molding was thermally treated at 1,100° C. for 40 hours in air, thereby synthesizing lanthanum manganite having a composition given in Table 1. The synthesized product was milled in a ball mill, thereby preparing lanthanum manganite powder having an average particle diameter of about 3 μm. Then, polyvinyl alcohol was dispersed as a binder into the resulting lanthanum manganite powder, which was molded into a rectangular plate by uniaxially pressing. The thus obtained molding was fired at 1,250° C. for 5 hours in air, thereby obtaining a sintered body. A rectangular rod having the size: a longitudinal side of 3 mm, a lateral side of 4 mm and a length of 40 mm was cut off as a experimental sample from the sintered body.

Measurements

First, the porosity of each sample was measured according to a water-replacing method. Results are shown in Table 1.

Next, the weight of each sample was measured. Thereafter, each sample was heated up to 1,000° C. at a heating rate of 200° C./hr in an air stream, and then kept at 1,000° C. for 5 hours. Air was succeedingly blown against the sample, thereby then rapidly cooling the sample. The weight of the thus rapidly cooled sample was measured as the weight at 1,000° C. A weight ratio was calculated by dividing the weight at 1,000° C. by the weight at room temperature. The "weight at room temperature" means the weight of the sample having undergone no special heat history, that is, the weight of the sample before being heated up to 1,000° C. Measured weight ratios are also given in Table 1.

For each example, a similar sample was prepared separately from the sample used above for the measurement of the weight, and was heated up to 600° C. at a heating rate of 200+ C./hr in air. Then, the sample was subjected to heat cycling at ten times between 600° C. and 1,000° C. at a heating/cooling rate of 200° C./hr, finally being cooled down to room temperature. In this case, in each heat cycle, the sample was kept at each of 600° C. and 1,000° C. for 30 minutes. Thereafter, the dimension of each sample was measured by using a micrometer, and a dimensional shrinkage rate of the sample was calculated between before and after the above heat cycling. Measurement results are shown in Table 1.

TABLE 1

| Sample No. | Composition | Porosity (%) | Weight ratio (1000° C./ room temp.) | Dimensional shrinkage rate (%/10 cycles) |
|---|---|---|---|---|
| 1-1 | $La_{0.8}Ca_{0.2}MnO_3$ | 30.6 | 0.9985 | 0.43 |
| 1-2 | $La_{0.7}Ca_{0.3}MnO_3$ | 29.1 | 0.9997 | 0.00 |
| 1-3 | $La_{0.8}Ca_{0.2}Mn_{0.95}Al_{0.05}O_3$ | 28.6 | 0.9988 | 0.03 |
| 1-4 | $La_{0.8}Ca_{0.2}Mn_{0.95}Mg_{0.05}O_3$ | 28.4 | 0.9989 | 0.06 |

As is clear from Table 1, when a value (weight ratio) obtained by dividing the weight of the porous sintered body at 1,000° C. by that at room temperature is not less than 0.9988 (Samples 1-2 through 1-4), the average value of dimensional shrinkage amounts caused by heat cycling at ten times in the initial stage after the firing is not more than 0.01% per one heat cycle. This value was 0.043% in Sample 1-1 as Comparative Example.

Further, with respect to Sample 1-1 in Table 1, a dimensional change was measured with a thermal expansion meter by heating the sample from room temperature to 1,000° C. and cooling it again. As a result, it was found out that the dimensionally shrunk phenomenon occurred in a temperature range of 900° C. to 800° C. during when the porous body was being cooled. Therefore, it is presumed that oxygen atoms are absorbed and metallic atoms transfer in this temperature range. Further, the results in the heat cycling over 600° C. to 1,000° C. are identical with those in the heat cycling over room temperature to 1,000° C.

Furthermore, Sample 1-1 was kept at 1,000° C. in air for 10 hours, and cooled to room temperature. Then, a dimensional change rate between before and after the heating was measured to be 0.03% shrinkage. On the other hand, it is seen from Table 1 that Sample 1-1 exhibited a dimensional shrinkage rate of 0.043% per one heat cycle in the case of heat cycling at ten times after the firing. Therefore, the above shrinkage of 0.03% substantially corresponds to the dimensional shrunk amount per one heat cycle. From this result, it can be said that the dimensional shrinkage of 0.03% occurred not during keeping the sample at 1,000° C. but during the cooling step from 1,000° C. to room temperature. In other words, the shrinkage phenomenon of the porous sintered body in the above heat cycling occurs according to a mechanism quite different from that by which the sintering proceeds when the porous sintered body is kept at a high temperature.

Experiment 2

As starting materials, $La_2O_3$, $Mn_3O_4$, $CaCO_3$, $MgO$, $NiO$, $CoO$, and $SrCO_3$ powders were used. In each sample, given amounts of starting materials were measured according to a compounding recipe shown in Table 2, and mixed together. Then, experiment were conducted in the same manner as in Experiment 1. Results are shown in Table 2.

TABLE 2

| Sample No. | Composition | Porosity (%) | Weight ratio (1000° C./room temp.) | Dimensional shrinkage rate (%/10 cycles) |
|---|---|---|---|---|
| Comparative Example 1-11 | $La_{0.9}Sr_{0.1}MnO_3$ | 36.9 | 0.9982 | 0.12 |
| Example 1-11 | $La_{0.75}Ca_{0.25}MnO_3$ | 39.0 | 0.9990 | 0.10 |
| Example 1-12 | $La_{0.725}Ca_{0.275}MnO_3$ | 37.5 | 0.9997 | 0.03 |
| Example 1-13 | $La_{0.675}Ca_{0.325}MnO_3$ | 24.9 | 1.000 | 0.00 |
| Example 1-14 | $La_{0.8}Ca_{0.2}Mn_{0.95}Ni_{0.05}O_3$ | 24.3 | 0.9999 | 0.07 |
| Example 1-15 | $La_{0.8}Ca_{0.2}Mn_{0.9}Ni_{0.1}O_3$ | 31.7 | 0.9999 | 0.02 |
| Example 1-16 | $La_{0.8}Ca_{0.2}Mn_{0.95}Co_{0.05}O_3$ | 29.5 | 0.9998 | 0.07 |
| Example 1-17 | $La_{0.8}Ca_{0.2}Mn_{0.9}Mg_{0.1}O_3$ | 30.7 | 0.9999 | 0.01 |

As is seen from Comparative Example 1-11, with respect to $La_{0.9}Sr_{0.1}MnO_3$ which has been ordinary used as a material for air electrodes, it was confirmed that shrinkage in the heat cycling was observed and the above-mentioned weight ratio was less than 0.9988. In each of Examples 1-11 through 1-17, the dimensional shrinkage rate was not more than 0.01% per one heat cycle, and the weight ratio measured was not less than 0.9988 but not more than 1.0000.

Experiment 3

As starting materials, $La_2O_3$, $Mn_3O_4$, $CaCO_3$, $SrCO_3$, $NiO$, $MgO$ and $CoO$ powders were used. In each sample, given amounts of starting materials were measured according to a compounding recipe given in Table 3 or 4, and mixed together. The resulting mixed powder was molded under a pressure of 1 tf/cm$^2$ by cold isostatic pressing, thereby producing a molding. The resulting molding was thermally treated at 1,550° C. for 5 hours in air, thereby synthesizing lanthanum manganite having a composition given in Table 3 or 4.

The synthesized product was milled in a ball mill, thereby preparing lanthanum manganite powder having the average particle diameter of about 4 to about 6 μm. Then, polyvinyl alcohol was dispersed as a binder into the lanthanum manganite powder, which was molded into a rectangular plate by uniaxially pressing. The resulting molding was fired at 1,400° C. to 1,600° C. for 4 hours in air, thereby obtaining a sintered body. A rectangular rod having the size: a longitudinal side of 3 mm, a lateral side of 4 mm and a length of 40 mm was cut off as an experimental sample from the sintered body.

First, the porosity of each sample was measured according to a water-replacing method. Results are shown in Table 3 and 4.

Next, each sample was heated up to 600° C. at a heating rate of 200° C./hr in air, which was then subjected to heat cycling at ten times between 600° C. and 1,000° C. at heating/cooling rate of 200° C./h, and finally cooled down to room temperature. At that time, in each heating cycle, the sample was kept at each of 600° C. and 1,000° C. for 3 minutes. Thereafter, the dimension of each sample was measured by using a micrometer, and the dimensional shrinkage rate between before and after the heat cycling was calculated. Measurement results are shown in Tables 3 and 4.

Figure 1:
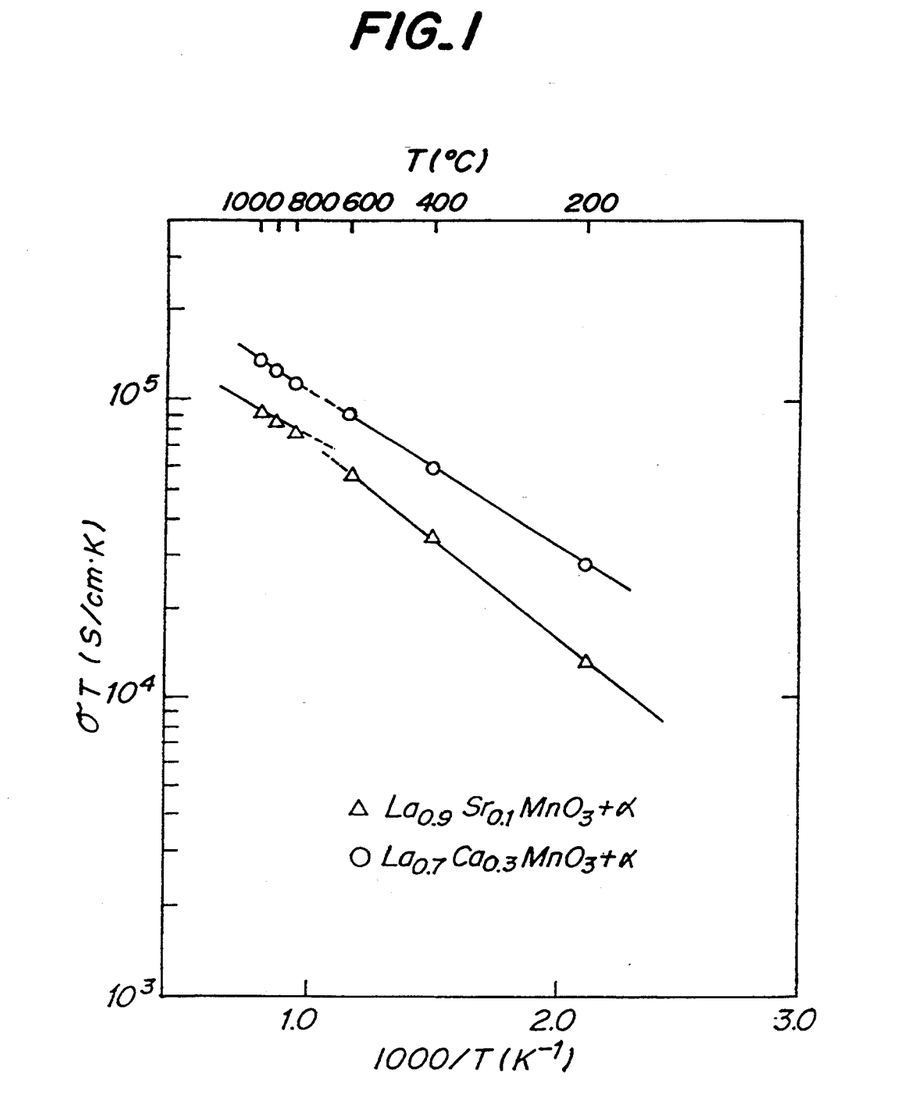
FIG. 1 is a graph showing examples of Arrhenius plotting with respect to porous sintered bodies.

With respect to each of porous sintered bodies having respective lanthanum manganite compositions, electric conductivity at each temperature was measured by a DC four-terminal process, and activating energies in a range of 200° C. to 600° C. and in a range of 900° C. to 1,000° C. and a difference Δ between these activating energies were calculated. Results are shown in Tables 3 and 4. In order to calculate the activating energy, an Arrhenius plot diagram was prepared as shown Table 1., That is, FIG. 1 shows the Arrhenius plot diagram with respect to the composition of $La_{0.9}Sr_{0.1}MnO_3$ and the composition of $La_{0.7}Ca_{0.3}MnO_3$. In FIG. 1, the abscissa and the ordinate denote $1000/T(K^{-1})$ or T(°C.) and $\sigma T(S/cm.K)$, respectively. $\sigma$ is an electric conductivity. The activating energy was calculated from this Arrhenius plot diagram.

As is seen from FIG. 1, a gradient in the range of 200° C. to 600° C. greatly differs from that in the range of 900° C. to 1,000° C. in the case of $La_{0.9}Sr_{0.1}MnO_3$ composition. More specifically, as shown in Table 2, ΔE is as much as 0.039 eV. On the other hand, in the case of the composition of $La_{0.7}Ca_{0.3}MnO_3$, ΔE between the gradient in the range of 200° C. to 600° C. and that in the range of 900° C. to 1,000° C. is smaller.

Figure 2:
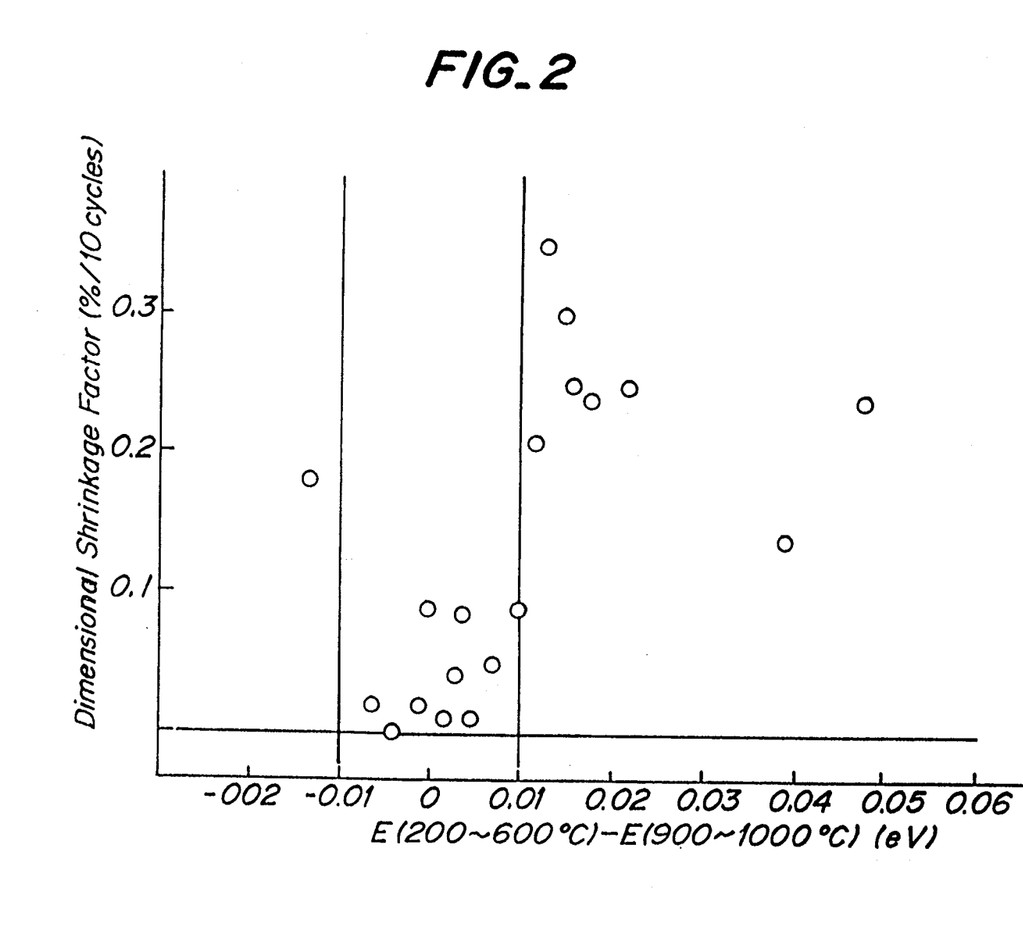
FIG. 2 is a graph showing the relationship between difference $\Delta E$ in the activating energy of the electric conductivity and the dimensional shrinkage rate (%/10 cycles)

Although only two examples are shown in FIG. 1, with respect to the other compositions given in Tables 3 and 4, activation energies in a range of 200° C. to 600° C. and in a range of 900° C. to 1,000° C. and a difference ΔE between these activation energies were calculated. In FIG. 2 is plotted the relationship between ΔE and the dimensional shrinkage rate (% per ten cycles) with respect to each sample.

TABLE 4

| Sample No. | Composition | E (eV) in 200–600° C. | E eV) in 900–1000° C. | ΔE (eV) | Dimensional shrinkage rate (%/10 cycles) | Porosity (%) |
|---|---|---|---|---|---|---|
| Comparative Example 1-20 | $La_{0.9}Sr_{0.1}MnO_3$ | 0.129 | 0.090 | 0.039 | 0.14 | 37.4 |
| Comparative Example 1-21 | $La_{0.8}Sr_{0.2}MnO_3$ | 0.127 | 0.114 | 0.013 | 0.35 | 40.0 |
| Comparative Example 1-22 | $La_{0.82}Sr_{0.18}MnO_3$ | 0.093 | 0.106 | −0.013 | 0.18 | 39.9 |
| Comparative Example 1-23 | $La_{0.85}Ca_{0.15}MnO_3$ | 0.155 | 0.107 | 0.048 | 0.24 | 28.7 |
| Comparative Example 1-24 | $La_{0.8}Ca_{0.2}Mn_{0.99}Ni_{0.01}O_3$ | 0.132 | 0.117 | 0.015 | 0.30 | 33.1 |
| Comparative Example 1-25 | $La_{0.8}Ca_{0.2}Mn_{0.999}Mg_{0.001}O_3$ | 0.135 | 0.113 | 0.022 | 0.25 | 33.2 |
| Comparative Example 1-26 | $La_{0.8}Ca_{0.2}Mn_{0.99}Mg_{0.01}O_3$ | 0.135 | 0.117 | 0.018 | 0.24 | 31.0 |
| Comparative Example 1-27 | $La_{0.8}Ca_{0.2}Mn_{0.999}Co_{0.001}O_3$ | 0.129 | 0.113 | 0.016 | 0.25 | 28.9 |
| Comparative Example 1-28 | $La_{0.8}Ca_{0.2}Mn_{0.99}Co_{0.01}O_3$ | 0.132 | 0.120 | 0.012 | 0.21 | 28.6 |
| Comparative Example 1-20 | $La_{0.9}Sr_{0.1}MnO_3$ | 0.129 | 0.090 | 0.039 | 0.14 | 37.4 |
| Comparative Example 1-21 | $La_{0.8}Sr_{0.2}MnO_3$ | 0.127 | 0.114 | 0.013 | 0.35 | 40.0 |
| Comparative Example 1-22 | $La_{0.82}Sr_{0.18}MnO_3$ | 0.093 | 0.106 | −0.013 | 0.18 | 39.9 |
| Comparative Example 1-23 | $La_{0.85}Ca_{0.15}MnO_3$ | 0.155 | 0.107 | 0.048 | 0.24 | 28.7 |
| Comparative Example 1-24 | $La_{0.8}Ca_{0.2}Mn_{0.99}Ni_{0.01}O_3$ | 0.132 | 0.117 | 0.015 | 0.30 | 33.1 |
| Comparative Example 1-25 | $La_{0.8}Ca_{0.2}Mn_{0.999}Mg_{0.001}O_3$ | 0.135 | 0.113 | 0.022 | 0.25 | 33.2 |
| Comparative Example 1-26 | $La_{0.8}Ca_{0.2}Mn_{0.99}Mg_{0.01}O_3$ | 0.135 | 0.117 | 0.018 | 0.24 | 31.0 |
| Comparative Example 1-27 | $La_{0.8}Ca_{0.2}Mn_{0.999}Co_{0.001}O_3$ | 0.129 | 0.113 | 0.016 | 0.25 | 28.9 |
| Comparative Example 1-28 | $La_{0.8}Ca_{0.2}Mn_{0.99}Co_{0.01}O_3$ | 0.132 | 0.120 | 0.012 | 0.21 | 28.6 |
| Comparative Example 1-20 | $La_{0.9}Sr_{0.1}MnO_3$ | 0.129 | 0.090 | 0.039 | 0.14 | 37.4 |

As is seen from the above results, the dimensional shrinkage rate is not more than 0.01% per one heat cycle by suppressing ΔE to a range of 0.01 to −0.01 eV. However, if ΔE is more than 0.01 eV or less than −0.01 eV, the dimensional shrinkage rate exceeds 0.01% per one heat cycle. But, no clear regularity is observed in either one of these areas.

As mentioned above, according to the first aspect of the present invention, since the dimensional shrinkage caused in the porous sintered body made of lanthanum manganite by the heat cycling is suppressed, no cracking occurs between the porous sintered body and the other constituent materials even when a structure involving the porous sintered body and these constituent materials is subjected to the heat cycling.

II. Next, the second aspect of the present invention will be explained in more detail with respect to Examples and Comparative Examples.

Experiment 4

As starting materials, $La_2O_3$, $Mn_3O_4$, $CaCO_3$, $Al_2O_3$, CoO, MgO and NiO powders were used. In each sample, given amounts of starting materials were measured according to a compounding recipe given in Table 5, 6 or 7, and mixed together. A sintered body was obtained from the resulting mixed powder in the same manner as described in Experiment 1 in connection with the first aspect of the present invention, except that in Experiment 4, the average particle diameter of lanthanum manganite powder obtained by the ball mill was about 3 μm to about 6 μm. A rectangular rod having a longitudinal side of 3 mm, a lateral side of 4 mm and a length of 40 mm was cut off from the sintered body as an experimental sample.

Measurements

Figure 3:
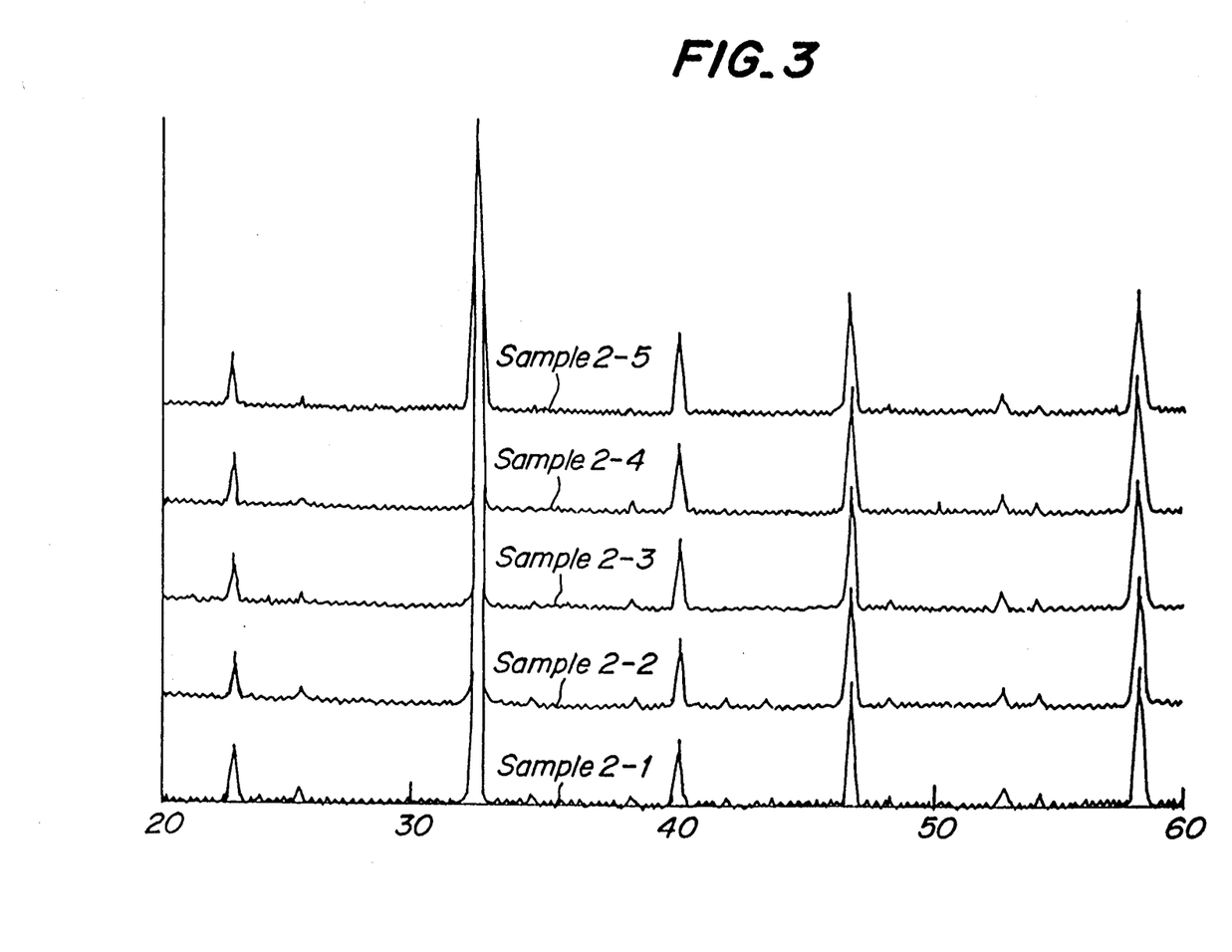
FIG. 3 is a graph showing an X-ray diffracting pattern of lanthanum manganite constituting a porous sintered body in each example.

First, with respect to each sample, the porosity of the sample was measured by the water-replacing process. Results are shown in Tables 5 to 7. Further, each of Samples 2-1 through 2-5 given in Table 5 was milled again in a crucible, which was subjected to an X-ray refraction measurement by a powder process. Measurement results are shown FIG. 3. Indication of Samples 2-1 through 2-5 given to respective curves in Table 3 correspond to those in FIG. 5. As is seen from FIG. 3, the refraction pattern of each of Samples 2-2 through 2-5 as Examples of the second aspect of the present invention is substantially the same as that of Sample 2-1 as Comparative Example, and exhibits a single phase. As is judged from these X-ray refraction patterns, nickel, cobalt, magnesium, or aluminum is certainly solid solved into crystals of lanthanum manganite in Samples 2-2 through 2-5.

Next, each example was heated up to 600° C. at a heating rate of 200° C./hr in air, and then subjected to heat cycling at ten times between 600° C. and 1,000° C. at a heating/cooling rate of 200° C./hr, finally being cooled down to room temperature. In this case, in each heat cycle, the sample was kept at each of 600° C. and 1,000° C. for 30 minutes. Thereafter, the dimension of each sample was measured by using a micrometer, and a dimensional shrinkage rate of the sample was calculated between before and after the above heat cycle.

These measurement results are shown in Tables 5, 6 and 7.

TABLE 5

| Sample No. | Composition | Porosity (%) | Dimensional shrinkage rate (%/10 cycles) |
|---|---|---|---|
| 2-1 | $La_{0.8}Ca_{0.2}MnO_3$ | 30.6 | 0.43 |
| 2-2 | $La_{0.8}Ca_{0.2}Mn_{0.95}Ni_{0.05}O_3$ | 39.0 | 0.05 |
| 2-3 | $La_{0.8}Ca_{0.2}Mn_{0.95}Co_{0.05}O_3$ | 28.9 | 0.09 |
| 2-4 | $La_{0.8}Ca_{0.2}Mn_{0.95}Mg_{0.05}O_3$ | 28.4 | 0.06 |
| 2-5 | $La_{0.8}Ca_{0.2}Mn_{0.95}Al_{0.05}O_3$ | 28.6 | 0.03 |

TABLE 6

| Sample No. | Composition | Porosity (%) | Dimensional shrinkage rate (%/10 cycles) |
|---|---|---|---|
| 2-6 | $La_{0.8}Ca_{0.2}Mn_{0.9999}Ni_{0.0001}O_3$ | 32.4 | 0.28 |
| 2-7 | $La_{0.8}Ca_{0.2}Mn_{0.9999}Co_{0.0001}O_3$ | 30.9 | 0.22 |
| 2-8 | $La_{0.8}Ca_{0.2}Mn_{0.9999}Mg_{0.0001}O_3$ | 29.3 | 0.25 |
| 2-9 | $La_{0.8}Ca_{0.2}Mn_{0.9999}Al_{0.0001}O_3$ | 30.4 | 0.16 |

TABLE 7

| Sample No. | Composition | Porosity (%) | Dimensional shrinkage rate (%/10 cycles) |
|---|---|---|---|
| 2-10 | $La_{0.8}Ca_{0.2}Mn_{0.90}Ni_{0.10}O_3$ | 31.8 | 0.02 |
| 2-11 | $La_{0.8}Ca_{0.2}Mn_{0.90}Co_{0.10}O_3$ | 28.7 | 0.00 |
| 2-12 | $La_{0.8}Ca_{0.2}Mn_{0.90}Mg_{0.10}O_3$ | 30.8 | 0.01 |
| 2-13 | $La_{0.8}Ca_{0.2}Mn_{0.90}Al_{0.10}O_3$ | 27.3 | 0.09 |
| 2-14 | $La_{0.8}Ca_{0.2}Mn_{0.85}Ni_{0.15}O_3$ | 29.8 | 0.00 |
| 2-15 | $La_{0.8}Ca_{0.2}Mn_{0.85}Co_{0.15}O_3$ | 34.2 | 0.01 |
| 2-16 | $La_{0.8}Ca_{0.2}Mn_{0.85}Mg_{0.15}O_3$ | 31.7 | 0.00 |
| 2-17 | $La_{0.8}Ca_{0.2}Mn_{0.85}Al_{0.15}O_3$ | 27.6 | 0.02 |
| 2-18 | $La_{0.8}Ca_{0.2}Mn_{0.80}Ni_{0.20}O_3$ | 28.4 | 0.00 |
| 2-19 | $La_{0.8}Ca_{0.2}Mn_{0.80}Co_{0.20}O_3$ | 32.9 | 0.00 |
| 2-20 | $La_{0.8}Ca_{0.2}Mn_{0.80}Mg_{0.20}O_3$ | 34.1 | 0.01 |
| 2-21 | $La_{0.8}Ca_{0.2}Mn_{0.80}Al_{0.20}O_3$ | 27.7 | 0.02 |

In each of Samples 2-1 through 2-5 in Table 5, 20% of lanthanum atoms at the A-sites were substituted by calcium. Further, in each of Samples 2-2 through 2-5, 5% of manganese atoms at the B-sites are substituted by nickel, cobalt, magnesium, or aluminum. In each of Samples 2-2 through 2-5 as Examples of the present invention, the average dimensional shrinkage rate in the heat cycling at ten times in the initial stage after the sintering is not more than 0.01% per one heat cycle, whereas this average dimensional shrinkage rate is as much as 0.043% per one heat cycle.

Further, Sample 2-1 in Table 5 was heated from room temperature to 1,000° C., and then cooled. Thereafter, a dimensional change was measured by using a thermal expansion meter. As a result, it was found out that the dimensional shrunk phenomenon occurred in a temperature range of 900° C. to 800° during when the temperature is decreased. Therefore, it is presumed that absorption of oxygen and transfer of metal atoms occur in this temperature range. Further, the results in the heat cycling over the range of 600° C. to 1,000° C. are the same as those over room temperature and 1,000° C.

Furthermore, Sample 2-1 was kept at 1,000° C. in air for 10 hours, and cooled down to room temperature. Then, the dimensional change was measured to be 0.03% shrinkage between before and after the heating. On the other hand, it is seen from Table 5 that the dimensional shrinkage rate in the heat cycling at ten times after the sintering was 0.043% per one heat cycle. Therefore, the shrinkage of 0.03% substantially corresponds to the dimensional shrinkage rate per one heat cycle. It can be said from the above result that the dimensional shrinkage of 0.03% occurred not during when the sample was kept at 1,000° C. for 10 hours but during when the sample was cooled from 1,000° C. to room temperature. In other words, the shrinkage phenomenon that the porous sintered body is shrunk during the heat cycling occurs based on a mechanism quite different from that by which the sintering proceeds when the porous sintered body is kept at a high temperature.

Table 6 gives Samples in which 0.01% of manganese-sites are occupied by nickel, cobalt, magnesium or aluminum. Table 7 shows Samples in which 10%, 15% or 20% of manganese-sites are substituted by nickel, cobalt, magnesium or aluminum. In a graph of FIG. 4, results in Tables 5 through 7 are plotted in a coordinate in which an abscissa and an ordinate are taken as the substituted amount (%) of the above-recited metal atoms at the B-sites and the shrinkage amount (%) per on heat cycle, respectively.

Figure 4:
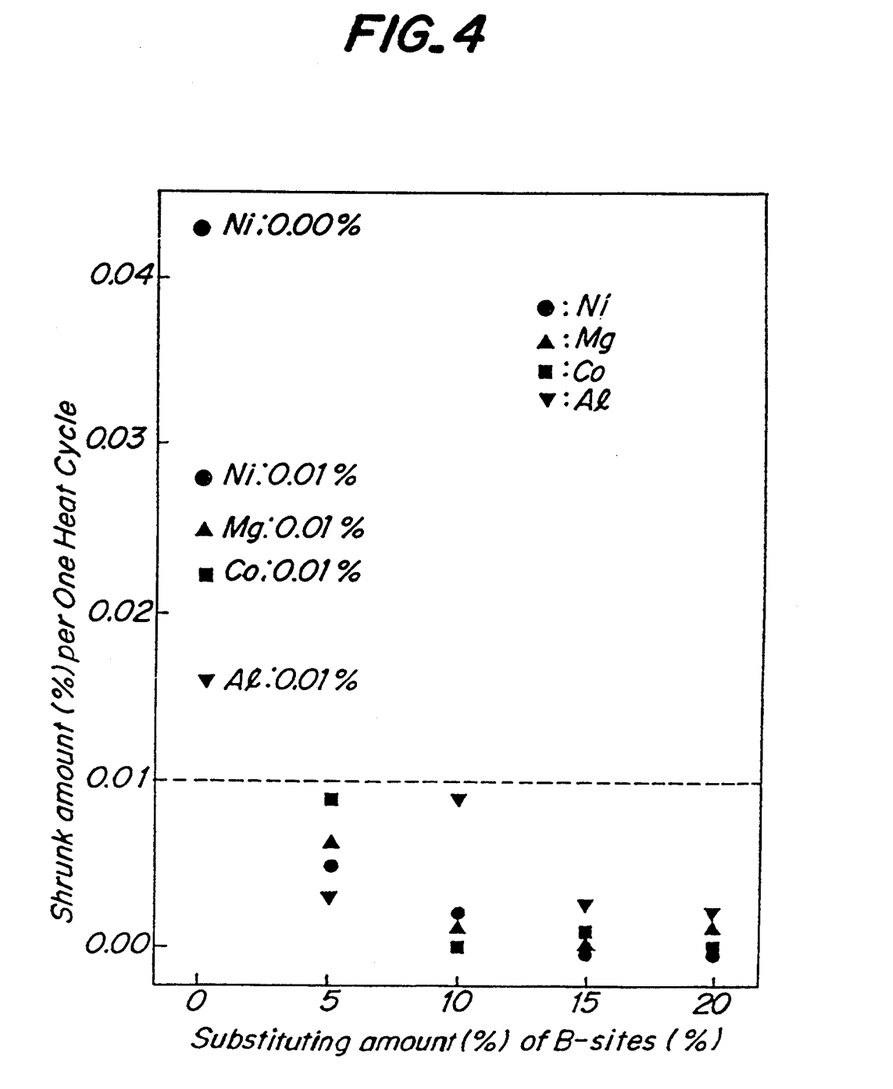
FIG. 4 is a graph showing the relationship between the substituted amount of B-sites of lanthanum manganite and the dimensional shrinkage amounts of porous sintered bodies per one cycle in the heat cycling.

As is seen from Tables 5, 6, 7 and FIG. 4, although attained effects slightly differ depending upon the kinds of the substituting elements, the shrinkage in the heat cycling is suppressed by increasing the substituting amount thereof. The substituting amount is preferably 5% to 20%.

Experiment 5

Among samples shown in Tables 5 through 7, Samples given in Table 8 were selected, and their electric conductivity at 1,000° C. was measured. The electric conductivity at 1,000° C. is a characteristic required as the air electrode for the SOFC. The above measurement was effected at 1,000° C. in air by a DC four-terminal process. Results are shown in Table 8.

In order to remove an influence upon the electric conductivity due to difference in porosity, measurement data given in Table 8 were obtained by correcting actual data through calculation to correspond to those at the porosity of 30%.

TABLE 8

| Sample No. | Composition | Conductivity (S/cm) |
|---|---|---|
| 2-6 | $La_{0.8}Ca_{0.2}Mn_{0.9999}Ni_{0.0001}O_3$ | 102 |
| 2-7 | $La_{0.8}Ca_{0.2}Mn_{0.9999}Co_{0.0001}O_3$ | 98 |
| 2-3 | $La_{0.8}Ca_{0.2}Mn_{0.95}Co_{0.05}O_3$ | 90 |
| 2-15 | $La_{0.8}Ca_{0.2}Mn_{0.85}Co_{0.15}O_3$ | 56 |
| 2-8 | $La_{0.8}Ca_{0.2}Mn_{0.999}Mg_{0.0001}O_3$ | 92 |
| 2-4 | $La_{0.8}Ca_{0.2}Mn_{0.95}Mg_{0.05}O_3$ | 74 |
| 2-16 | $La_{0.8}Ca_{0.2}Mn_{0.85}Mg_{0.15}O_3$ | 49 |

As is seen from Table 8, there is a tendency that as the substituted amount of the B-sites increases, the electric conductivity decreases. In particular, when the substituted amount exceeds 15%, the electric conductivity decreases to about a half of that in the case when none of the B-sites are substituted. Such a tendency is the same with respect to cases where the substituting atoms are nickel or aluminum.

The above cause is considered as follows. That is, since the electrically conductive mechanism in lanthanum manganite is based on a hopping conduction of holes formed when the valency of manganese changes from 3 to 4, the content of manganese constituting conductive paths in the crystal decreases. Anyway, the substituting amount of each of the above-recited atoms at the B-sites is preferably not more than 15%, more preferably not more than 10%. Moreover, when the above-mentioned problem of the shrinkage amount in the heat cycling is considered, the substituting amount of the metallic atoms is further preferably 5% to 15%, and most preferably 5% to 10%.

With respect to a composition of $La_{1-x}A_xMn_{0.95}Ni_{0.05}O_3$, the relationship between the substituting amount of X and the coefficient of thermal expansion was examined. As a reference, a coefficient of thermal expansion of 8 mol % yttria-stabilized zirconia is shown. $La_2O_3$, $Mn_3O_4$, $CaCO_3$, $SrCO_3$ and NiO were used as starting materials. In each sample, given amounts of starting materials are weighed according to a compounding recipe in Table 5, and mixed. The resulting mixed powder was molded under a pressure of 1 tf/cm² by cold isostatic pressing. Thus obtained molding was heated at 1,100° C. in air for 40 hours, thereby synthesizing lanthanum manganite having a composition shown in Table 5. This synthesized product was milled by a ball mill, thereby obtaining powdery lanthanum manganite having the average particle diameter of about 4 to 6 μm. Then, polyvinyl alcohol was dispersed into the resulting lanthanum manganite powder as a binder, and a rectangular plate was molded from the powder by uniaxial pressing. The molding was fired at 1,200° to 1,500° C. for 5 hours in air, thereby obtaining a sintered body having a porosity of 30±1%. A square rod having a shape of a vertical side: 3 mm, a lateral side: 4 mm and a height: 40 mm was cut as an experimental sample from the resulting sintered body.

TABLE 9

| Composition | Average coefficient of thermal expansion (× $10^{-6}$/K, 20° C.~1000° C.) |
|---|---|
| $LaMn_{0.95}Ni_{0.05}O_3$ | 12.3 |
| $La_{0.95}Ca_{0.05}Mn_{0.95}Ni_{0.05}O_3$ | 12.1 |
| $La_{0.90}Ca_{0.10}Mn_{0.95}Ni_{0.05}O_3$ | 11.3 |
| $La_{0.85}Ca_{0.15}Mn_{0.95}Ni_{0.05}O_3$ | 11.0 |
| $La_{0.8}Ca_{0.2}Mn_{0.95}Ni_{0.05}O_3$ | 10.8 |
| $La_{0.75}Ca_{0.25}Mn_{0.95}Ni_{0.05}O_3$ | 11.1 |
| $La_{0.725}Ca_{0.275}Mn_{0.95}Ni_{0.05}O_3$ | 11.1 |
| $La_{0.7}Ca_{0.3}Mn_{0.95}Ni_{0.05}O_3$ | 11.2 |
| $La_{0.675}Ca_{0.325}Mn_{0.95}Ni_{0.05}O_3$ | 11.4 |
| $La_{0.65}Ca_{0.35}Mn_{0.95}Ni_{0.05}O_3$ | 11.5 |
| $La_{0.95}Sr_{0.05}Mn_{0.95}Ni_{0.05}O_3$ | 11.2 |
| $La_{0.90}Sr_{0.10}Mn_{0.95}Ni_{0.05}O_3$ | 11.0 |
| $La_{0.8}Sr_{0.2}Mn_{0.95}Ni_{0.05}O_3$ | 11.3 |
| $La_{0.7}Sr_{0.3}Mn_{0.95}Ni_{0.05}O_3$ | 11.8 |
| 8 mol % yttria stabilized zirconia | 10.5 |

The coefficient of thermal expansion was minimum when the substituting amount x of Ca was about 0.2, and also minimum when the substituting amount x of Sr was about 0.1. In order to obtain a cell stable for a long time period by conforming the coefficient of thermal expansion of lanthanum manganite with that of yttria-stabilized zirconia, the substituting amount x of Ca is preferably $0.1 \leq x \leq 0.3$, whereas the substituting amount x of Sr is preferably $0.5 \leq x \leq 0.20$.

As mentioned above, according to the second aspect of the present invention, since a part of manganese atoms at the B-sites of lanthanum manganite constituting the porous sintered body are substituted by atoms of at least one metal selected from the group consisting of aluminum, cobalt, magnesium and nickel, the dimensional shrinkage of the porous sintered body in the heat cycling can be suppressed.

III. The third aspect of the present invention will be explained in more detail with reference to Examples and Comparative Examples.

Experiment 6

As starting materials, $La_2O_3$, $Mn_3O_4$, $CaCO_3$, and $SrCO_3$ powders were used. In each sample, given amounts of starting materials were measured according to a compounding recipe given in Table 9, and mixed together. The resulting mixed powder was molded under a pressure of 1 tf/cm² by cold isostatic pressing, thereby producing a molding. The resulting molding was heated at 1,550° C. for 10 hours in air, thereby synthesizing lanthanum manganite having a composition given in Table 9.

The synthesized product was milled in a ball mill, thereby preparing lanthanum manganite powder having the average particle diameter of about 4 μm. Then, polyvinyl alcohol was dispersed as a binder into the lanthanum manganite powder, which was molded in the form of a rectangular plate by uniaxially pressing. The resulting molding was fired at 1,450° C. for 5 hours in air, thereby obtaining a sintered body. A rectangular rod having the size: a longitudinal side of 3 mm, a lateral side of 4 mm and a length of 40 mm was cut off as an experimental sample from the sintered body.

Measurements

First, the porosity of each sample was measured according to a water-replacing method. Results are shown in Table 9.

Next, each sample was heated up to 600° C. in air at a heating rate of 200° C./hr, which was then subjected to heat cycling at 10 times, 20 times, 40 times or 100 times at heating/cooling rate of 200° C./hr between 600° C. and 1,000° C. and finally cooled to room temperature. At that time, each sample was kept constant at each of 600° C. and 1,000° C. for 30 minutes. Thereafter, the dimension of the sample was measured by using a micrometer, and the dimensional shrinkage rate between before and after the heat cycling was calculated. Results are shown in Table 10.

TABLE 10

| Sample No. | Compositon | Porosity (%) | Dimensional shrinkage rate (%) | | | |
|---|---|---|---|---|---|---|
| | | | 10 cycles | 20 cycles | 40 cycles | 100 cycles |
| 3-1 | $La_{0.9}Sr_{0.1}MnO_3$ | 26.4 | 0.25 | — | — | — |
| 3-2 | $La_{0.8}Sr_{0.2}MnO_3$ | 19.8 | 0.09 | 0.14 | 0.25 | 0.51 |
| 3-3 | $La_{0.75}Sr_{0.25}MnO_3$ | 34.1 | 0.01 | 0.01 | 0.01 | 0.01 |
| 3-4 | $La_{0.9}Ca_{0.1}MnO_3$ | 37.0 | 0.15 | — | — | — |
| 3-5 | $La_{0.8}Ca_{0.2}MnO_3$ | 28.5 | 0.29 | 0.56 | 1.10 | 2.42 |
| 3-6 | $La_{0.75}Ca_{0.25}MnO_3$ | 21.3 | 0.10 | 0.16 | 0.28 | 0.59 |
| 3-7 | $La_{0.7}Ca_{0.3}MnO_3$ | 40.9 | 0.00 | 0.00 | 0.01 | 0.01 |

As is seen from Table 10, with respect to Samples 3-2, 3-3, 3-6 and 3-7 as Examples of the present invention, the average dimensional shrinkage rate in the heat cycling at 10 times in the initial stage after the firing is not more than 0.01% per one heat cycle. This average dimensional shrinkage rate is 0.025% for Sample 3-1, 0.015% for Sample 3-4, and 0.029% for Sample 3-5. With respect to Sample 3-5 as Comparative Example, the dimensional shrunk amounts in the heat cycling at 20 times, 40 times and 100 times increases almost in proportion to the number of times of the heat cycles, and thus it is understood that the dimensionally shrunk amount is not still converged even when the number of times of the heat cycles is increased. In Samples 3-2 and 3-6 as Examples of the present invention, it is seen that although the absolute value of the dimensionally shrunk amount is small, the dimensionally shrunk amount is not still converged, either, even when the number of repetitions of the heat cycles is 100.

With respect to Sample 3-1 in Table 10, the sample was heated from room temperature to 1,000° C. and cooled to room temperature again, and the dimensional change was measured by using a thermal expansion meter. As a result, it was found out that the dimensionally shrunk phenomenon occurs in the temperature range of 900° C. to 800° C. during when the temperature was being brought down. Therefore, it is presumed that absorption of oxygen and transfer of metal atoms occur in this temperature range. Further, the results in the heat cycling over 600° C. to 1,000° C. are the same as in the heat cycling over room temperature to 1,000° C.

Further, Sample 3-5 was maintained at 1,000° C. in air for 10 hours, and cooled to room temperature. Then, the dimensional change rate between before and after the heating was measured, which showed 0.03% shrinkage between them. On the other hand, it is seen from Table 10 that the average dimensional shrinkage rate in the heat cycling at 10 times after the sintering is 0.029% per one heat cycle. From this result, it can be said that the dimensional shrinkage by 0.03% occurred not during when the sample was kept at 1,000° C. for 10 hours but during when the sample was cooled from 1,000° C. to room temperature. In other words, the shrinkage phenomenon of the porous sintered body in the heat cycle occurs by a mechanism quite different from that by which the sintering progresses when the porous sintered body is kept at a high temperature.

With respect to Samples 3-5 and 3-7 in Table 10, the average coefficient of thermal expansion was measured between 900° C. and 1,000° C. by using a dilatometer during when the sample was being heated and during when the sample was being cooled. As a result, the coefficient of thermal expansion of Sample 3-5 changed by about 4% between 900° C. and 1,000° C. The coefficient of thermal expansion of Sample 3-7 changed by not more than 1%.

Experiment 7

As starting materials, $La_2O_3$, $Mn_3O_4$, and $CaCO_3$ powders were used. In each sample, given amounts of starting materials were measured according to a compounding recipe given in Table 11, and mixed together. The resulting mixed powder was molded under a pressure of 1 tf/cm$^2$ by cold isostatic pressing, thereby producing a molding. The molding was heated at 1,400° C. for 10 hours in air, thereby synthesizing lanthanum manganite having a composition given in Table 11.

The synthesized product was milled in a ball mill, thereby preparing lanthanum manganite powder having the average particle diameter of about 3 μm to about 6 μm. Then, polyvinyl alcohol was dispersed as a binder into the lanthanum manganite powder, which was molded into a rectangular plate by uniaxially pressing. The resulting molding was fired at 1,250° C. to 1,600° C. for 5 hours in air, thereby obtaining a sintered body. A rectangular rod having the size: a longitudinal side of 3 mm, a lateral side of 4 mm and a length of 40 mm was cut off from the sintered body. Thus, Samples 3-8 through 3-11 in Table 11 were prepared.

With respect to Samples 3-8 through 3-11 shown in Table 11, the porosity and the dimensional shrinkage rate were measured in the same manner as in Experiment 6, except that the number of heat cycles was 10.

Measurement results are shown in Table 11. With respect to Samples 3-5, 3-6 and 3-7 shown in Table 10, the composition, the porosity, and the dimensional shrinkage rate are given again in Table 11.

TABLE 11

| Sample No. | Composition | Porosity (%) | Dimensional shrinkage rate (%/10 cycles) |
|---|---|---|---|
| 3-8 | $La_{0.725}Ca_{0.275}MnO_3$ | 37.5 | 0.03 |
| 3-9 | $La_{0.657}Ca_{0.325}MnO_3$ | 24.9 | 0.00 |
| 3-10 | $La_{0.65}Ca_{0.35}MnO_3$ | 34.0 | 0.01 |
| 3-11 | $La_{0.6}Ca_{0.4}MnO_3$ | 5.1 | 0.00 |
| 3-5 | $La_{0.8}Ca_{0.2}MnO_3$ | 28.5 | 0.29 |
| 3-6 | $La_{0.75}Ca_{0.25}MnO_3$ | 21.3 | 0.10 |
| 3-7 | $La_{0.7}Ca_{0.3}MnO_3$ | 40.9 | 0.00 |

Sample 3-5 in Table 11 in which the substituting amount of calcium is 20% gives the dimensional shrinkage rate per one heat cycle being as much as 0.029%. In Sample 3-6, the substituting amount of calcium is 25%, but the above dimensional shrinkage rate is 0.01%. When the substituting amount of calcium is 27.5% (Sample 3-8), the dimensional shrinkage rate is 0.003% per one heat cycle. When the substituting amount of calcium is 30%, 32.5%, 35% or 40%, almost no dimensional shrinkage is observed.

Therefore, in order to suppress the dimensional shrinkage rate in the heat cycling, the substituting amount of calcium is set at preferably not less than 27.5%, more preferably not less than 30%. However, if the substituting amount of calcium was 40% (Sample 3-11 as Comparative Example), the sample was very likely to be sintered, so that the porosity decreased even when the sample was fired at the same temperature as in the other samples. This means that Sample 3-11 has low heat stability, and is unsuitable as a material for an air electrode in an SOFC which is operated in a high temperature environment at 1,000° C.

Experiment 8

With respect to Samples 3-5, 3-6, 3-7, 3-8 and 3-9 shown in Table 12, the coefficient of thermal expansion over 40° C. to 1,000° C. was measured. Measurement results are shown in Table 12.

TABLE 12

| Sample No. | Composition | Coefficient of thermal expansion ($\times 10^{-6}$/K) |
|---|---|---|
| 3-5 | $La_{0.8}Ca_{0.2}MnO_3$ | 10.9 |
| 3-6 | $La_{0.75}Ca_{0.25}MnO_3$ | 11.2 |
| 3-8 | $La_{0.725}Ca_{0.275}MnO_3$ | 11.3 |
| 3-7 | $La_{0.7}Ca_{0.3}MnO_3$ | 11.4 |
| 3-9 | $La_{0.675}Ca_{0.325}MnO_3$ | 11.5 |

As is seen from Table 12, there is a tendency that as the substituting amount of calcium is increased, the coefficient of thermal expansion of the porous sintered body increases. At present, zirconia is considered promising as a solid electrolyte material of the SOFC, and the coefficient of thermal expansion of zirconia is around $10.5 \times 10^{-6}$/K. Therefore, in order to match the thermal expansion between the solid electrolyte and the air electrode of the SOFC, it is better to suppress the substituting amount of calcium, and the substituting amount is particularly preferably 25% to 30%.

Experiment 9

As starting materials, $La_2O_3$, $Mn_3O_4$, and $SrCO_3$ powders were used. In each sample, given amounts of starting materials were measured according to a compounding recipe given in Table 13, and mixed together. The resulting mixed powder was molded under a pressure of 1 tf/cm² by cold isostatic pressing, thereby producing a molding. The molding was thermally treated at 1,550° C. for 13 hours in air, thereby synthesizing lanthanum manganite having a composition given in Table 12.

The synthesized product was milled in a ball mill, thereby preparing lanthanum manganite powder having the average particle diameter of about 4 μm to about 6 μm. Then, polyvinyl alcohol was dispersed as a binder into the lanthanum manganite powder, which was molded into a rectangular plate by uniaxially pressing. The resulting molding was fired at 1,400° C. to 1,600° C. for 5 hours in air, thereby obtaining a sintered body. A rectangular rod having the size: a longitudinal side of 3 mm, a lateral side of 4 mm and a length of 40 mm was cut off as an experimental sample from the sintered body.

Figure 5:
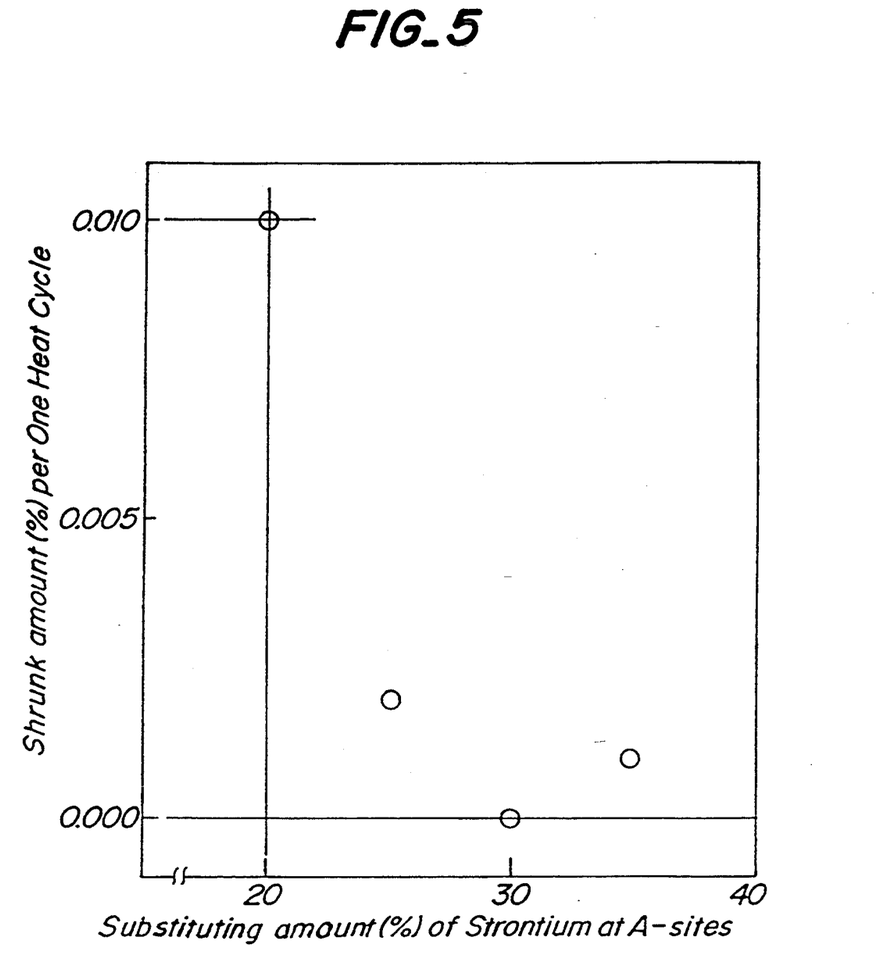
FIG. 5 is a graph showing the relationship between the dimensional shrinkage amounts of porous sintered bodies per one heat cycle and the substituting amount of strontium at A-sites.

With respect to each sample shown in Table 13, the porosity and the dimensional shrinkage rate were measured in the same manner as in Experiment 6, except that the number of heat cycles was 10. Measurement results are shown in Table 13. FIG. 5 shows the relationship between the substituting amount (%) of strontium at the A-sites and the dimensional shrinkage rate (%) per one heat cycle.

TABLE 13

| Sample No. | Composition | Porosity (%) | Dimensional shrinkage rate (%/10 cycles) |
| --- | --- | --- | --- |
| 3-12 | $La_{0.8}Sr_{0.2}MnO_3$ | 39.9 | 0.10 |
| 3-13 | $La_{0.75}Sr_{0.25}MnO_3$ | 37.5 | 0.02 |
| 3-14 | $La_{0.7}Sr_{0.3}MnO_3$ | 38.9 | 0.00 |
| 3-15 | $La_{0.65}Sr_{0.35}MnO_3$ | 32.1 | 0.01 |

As is seen from the above results, when the substituting amount of strontium is not less than 20%, the dimensional shrinkage rate of the porous sintered body is not more than 0.01% per one heat cycle. In particular, the above dimensional shrinkage rate is small in the case that the above substituting amount of strontium is 25% to 35%.

When the substituting amount of strontium is 27.5% to 32.5%, the above dimensional shrinkage rate is almost 0%. Further, in order to match the thermal expansion between the zirconia solid electrolyte and the air electrode of the SOFC, it is better to suppress the substituting amount of strontium to preferably not more than 35%, more preferably not more than 30%.

As mentioned above, according to the third aspect of the present invention, the dimensionally shrinkage amount of the porous sintered body in the heat cycling can be suppressed by setting the doping amount of calcium or strontium at the A-sites to a given level.

IV. Next, the fourth aspect of the present invention will be explained in more detail with reference to Examples and Comparative Examples.

Experiment 10

As starting materials, $La_2O_3$, $Mn_3O_4$, $CaCO_3$ and $SrCO_3$ powers were used. In each sample, given amounts of starting materials were measured according to a compounding recipe given in Table 13, and mixed together. A sintered body was obtained from the resulting mixed powder in the same manner as in Experiment 6, and a rectangular rod having the size: a longitudinal side of 3 mm, a lateral side of 4 mm and a length of 40 mm was cut off as an experimental sample from the sintered body. However, in Experiment 10, the average particle diameter of the lanthanum manganite powder obtained by the ball mill was about 5 μm, and the sintering temperature was 1,500° C.

Measurements

The porosity of each sample was measured by the water-replacing method. The content of a fine element was measured by an emission spectropic analysis process (ICP). Next, each sample was heated up to 600° C. in air at a heating rate of 200° C./hr, which was then subjected to heat cycle in air at 10 times at heating-/cooling rate of 200° C./hr between 600° C. and 1,000° C. and finally cooled to room temperature. At that time, the sample was kept constant at each of 600° C. and 1,000° C. for 30 minutes in each heat cycle. Thereafter, the dimension of the sample was measured by using a micrometer, and the dimensional shrinkage rate between before and after the heat cycling was calculated. Results are shown in Table 14.

TABLE 14

| Sample No. | Composition | Content (ppm) of fine element Fe | Content (ppm) of fine element Si | Porosity (%) | Dimensional shrinkage rate (%/10 cycles) |
| --- | --- | --- | --- | --- | --- |
| 4-1 | $La_{0.9}Sr_{0.1}MnO_3$ | 137 | 78 | 40.0 | 0.35 |
| 4-2 | $La_{0.9}Sr_{0.1}MnO_3$ | 37 | 168 | 36.1 | 0.09 |
| 4-3 | $La_{0.8}Ca_{0.2}MnO_3$ | 45 | 97 | 34.9 | 0.23 |
| 4-4 | $La_{0.8}Ca_{0.2}MnO_3$ | 13 | 144 | 39.0 | 0.07 |
| 4-5 | $La_{0.8}Ca_{0.2}MnO_3$ | 35 | 1020 | 19.5 | 0.09 |
| 4-6 | $La_{0.8}Ca_{0.2}MnO_3$ | 22 | 950 | 20.1 | 0.09 |

In Samples 4-2, 4-4, 4-5 and 4-6, the content of iron is not more than 40 ppm, and the content of silicon is not less than 100 ppm. In these cases, the average dimensional shrinkage rate in heat cycle at 10 times in the initial stage after the firing is not more than 0.01% per one heat cycle. This average dimensional shrinkage rate is 0.035% for Sample 4-1 and 0.023% for Sample 4-3.

Further, the dimensional change was measured by using a dilatometer with respect to Sample 4-1 in Table 14 by heating the sample from room temperature to 1,000° C. and then cooling it to room temperature. As a result, it was found out that the dimensional shrunk phenomenon occurs in a temperature range of 900° C. to 800° C. during cooling. Therefore, it is presumed that absorption of oxygen and transfer of metal atoms occur in this temperature range. Furthermore, the results in the heat cycling over 600° C. to 1,000° C. as the experimental conditions in this experiment are the same as those over room temperature to 1,000° C.

Moreover, Sample 4-1 was kept at 1,000° C. for 10 hours, and cooled to room temperature. Then, the dimensional change rate between before and after the heating was measured, which exhibited 0.03% shrinkage. On the other hand, it is seen from Table 14 that the dimensional shrinkage rate in the heat cycling at 10 times after the firing was 0.035% per one heat cycle. Therefore, the 0.03% shrinkage substantially corresponds to the dimensionally shrunk amount per one cycle. From this result, it can be said that the dimensional shrinkage of 0.03% occurred not during when the sample was held at 1,000° C. for 10 hours but during when the sample was cooled from 1,000° C. to room temperature. In other words, the shrinkage phenomenon that the porous sintered body is shrunk in the heat cycling occurs through a mechanism quite different from that by which the sintering progresses when the porous sintered body is held at a high temperature.

As mentioned above, according to the fourth aspect of the present invention, the dimensional shrinkage of the porous sintered body in the heat cycling can be substantially suppressed by controlling the content of iron in lanthanum manganite constituting the porous sintered body to not more than 40 ppm or by controlling the content of silicon in the lanthanum manganite to not less than 100 ppm.

What is claimed is:

1. A porous, self-supporting sintered body comprising of lanthanum manganite in which a part of lanthanum atoms at A-sites are substituted by atoms of a metal selected from the group consisting of alkaline earth metals and rare earth metals, wherein a dimensional shrinkage of the sintered body caused by heat cyclings between room temperature and 1,000° C. is not more than 0.01% per one heat cycle.

2. The porous, self-supporting sintered body set forth in claim 1, wherein said metal is selected from the group consisting of calcium and strontium.

3. The porous, self-supporting sintered body set forth in claim 1, wherein a value obtained by dividing a weight of the porous sintered body at 1,000° C. by that at room temperature is not less than 0.9988 but not more than 1.000.

4. The porous, self-supporting sintered body set forth in claim 1, wherein a difference in an activating energy of an electric conductivity of said body between a temperature range of 200° C. to 600° C. and a temperature range of 900° C. to 1,000° C. is not more than 0.01 eV.

5. The porous, self-supporting sintered body set forth in claim 3, wherein a difference in an activating energy of an electric conductivity of said body between a temperature range of 200° C. to 600° C. and a temperature range of 900° C. to 1,000° C. is not more than 0.01 eV.

6. The porous, self-supporting sintered body set forth in claim 1, which has a porosity ranging from 5% to 40%.

7. A solid oxide fuel cell comprising an air electrode composed of said porous sintered body set forth in claim 1.

8. The solid oxide fuel cell set forth in claim 7, wherein said air electrode has a cylindrical shape.

9. The porous, self-supporting sintered body set forth in claim 1, wherein a part of manganese atoms at B-sites of lanthanum manganite are substituted by atoms of at least one metal selected from the group consisting of aluminum, cobalt, magnesium and nickel.

10. The porous, self-supporting sintered body set forth in claim 9, wherein a substituting amount of the B-sites of said at least one metal selected from the group consisting of aluminum, cobalt, magnesium and nickel ranges from 0.2% to 20% of the B-sites.

11. The porous, self-supporting sintered body set forth claimed in claim 9, wherein a part of A-sites of said lanthanum manganite are substituted by atoms of at least one metal selected from the group consisting of calcium and strontium.

12. The porous, self-supporting sintered body set forth in claim 9, which has a porosity ranging from 5% to 40%.

13. A solid oxide fuel cell comprising an air electrode made of said porous sintered body set forth in claim 9.

14. The solid oxide fuel cell set forth in claim 13, wherein said air electrode has a cylindrical shape.

15. The porous, self-supporting sintered body set forth in claim 1, wherein a part of lanthanum atoms at A-sites of the lanthanum manganite are substituted by calcium and a substituting amount of calcium ranges from 25% to 35% of the A-sites.

16. The porous, self-supporting sintered body set forth in claim 15, which has a porosity ranging from 5% to 40%.

17. The porous self-supporting sintered body set forth in claim 15, wherein a change in coefficient of thermal expansion between during heating and during cooling in a range of 900° to 1,000° C. is not more than 2%.

18. A solid oxide fuel cell comprising an air electrode composed of said porous sintered body claimed in claim 15.

19. The solid oxide fuel cell set forth in claim 18, wherein said air electrode has a cylindrical shape.

20. A porous, self-supporting sintered body set forth in claim 1, wherein a part of lanthanum atoms at A-sites of the lanthanum manganite are substituted by strontium and a substituting amount of strontium ranges from 20% to 40% of the A-sites.

21. The porous self-supporting sintered body set forth in claim 20, which has a porosity ranging from 5% to 40%.

22. A solid oxide fuel cell comprising an air electrode made of said porous sintered body set forth in claim 20.

23. The solid oxide fuel cell claimed in claim 22, wherein said air electrode has a cylindrical shape.

24. The porous, self-supporting sintered body set forth in claim 1, wherein a content of iron in the lanthanum manganite is not more than 40 ppm.

25. The porous, self-supporting sintered body set forth in claim 24, wherein the content of iron in the lanthanum manganite is not less than 10 ppm.

26. The porous, self-supporting sintered body set forth in claim 24, wherein said metal substituting a part of the lanthanum atoms at the A-sites is selected from the group consisting of calcium and strontium.

27. A solid oxide fuel cell comprising an air electrode made of the porous sintered body set forth in claim 24.

28. The solid oxide fuel cell set forth in claim 27, wherein said air electrode has a cylindrical shape.

29. The porous sintered body set forth in claim 1, wherein a content of silicon in the lanthanum manganite is not less than 100 ppm.

30. The porous, self-supporting sintered body set forth in claim 29, wherein the content of silicon in the lanthanum manganite is not more than 5,000 ppm.

31. The porous, self-supporting sintered body set forth in claim 29, wherein said metal substituting a part of the lanthanum atoms at the A-sites is selected from the group consisting of calcium and strontium.

32. The porous self-supporting sintered body set forth in claim 29, wherein a content of iron in the lanthanum manganite ranges from 40 ppm to 10 ppm.

33. The porous, self-supporting sintered body set forth in claim 29 or 32, which has a porosity ranging from 5% to 40%.

34. A solid oxide fuel cell comprising an air electrode made of the porous sintered body set forth in claim 29.

35. The solid oxide fuel cell set forth in claim 34, wherein said air electrode has a cylindrical shape.

36. The porous, self-supporting sintered body set forth in claim 2, wherein a value obtained by dividing a weight of the porous sintered body at 1,000° C. by that at room temperature is not less than 0.9988 but not more than 1,000.

37. The porous, self-supporting sintered body set forth in claim 2, wherein a difference in an activating energy of an electric conductivity of said body between a temperature range of 200° C. to 600° C. and a temperature of 900° C. to 1,000° C. is not more than 0.01 eV.

* * * * *

UNITED STATES PATENT AND TRADEMARK OFFICE
CERTIFICATE OF CORRECTION

PATENT NO. : 5,432,024
DATED : July 11, 1995
INVENTOR(S) : Takao SOMA et al.

It is certified that error appears in the above-indentified patent and that said Letters Patent is hereby corrected as shown below:

On page 1, column 1, [75] line 3, change "Ichonomiya" to --Ichinomiya--.

Signed and Sealed this

Fifth Day of September, 1995

Attest:

BRUCE LEHMAN

*Attesting Officer*     *Commissioner of Patents and Trademarks*